United States Patent Office 3,234,228
Patented Feb. 8, 1966

3,234,228
HETEROCYCLIC THIOCARBONATE ESTERS
Howard Johnston, Concord, and Mary S. Tomita, Walnut Creek, Calif., assignors to The Dow Chemical Company, Midland, Mich., a corporation of Michigan
No Drawing. Filed Oct. 28, 1963, Ser. No. 319,559
10 Claims. (Cl. 260—294.8)

The present invention relates to thiocarbonate esters, more particularly to chloropyridinyl esters of thiocarbonic acid and having the structure

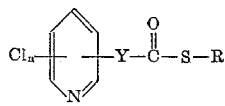

In this and succeeding formulas, Y is oxygen or sulfur, R is alkyl containing from 1 to 10 carbon atoms, inclusive, or aryl wherein said aryl is phenyl or substituted phenyl, preferably, alkylphenyl wherein the total carbon content of the aryl radical is from 6 to 10, inclusive, and $n$ is an integer of from 1 to 4, inclusive.

The products of the present invention are white or light colored solids or orange to colorless liquids. These products are of low solubility in water and vary from low to high solubility in many organic solvents such as acetone, ethanol, isopropyl alcohol, toluene, xylene, dimethylformamide, benzene, etc. The compounds of the present invention are useful as pesticides and are adapted to be employed for the control of soil infesting pests such as fungi and nematodes, for the control of undesirable plants and for the control of helminths.

The chloropyridinyl thiocarbonate esters of the present invention may be prepared by mixing together and reacting an appropriate thiolchloroformate ester represented by the formula

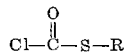

and an appropriate chloropyridinol compound represented by the formula

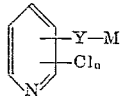

wherein M is hydrogen or salt forming cationic group and wherein under the conditions of the reaction, the desired product and a by-product chloride are formed. The chloride is recovered as a salt. When M is hydrogen, the reaction is carried out in the presence of a nitrogen base, preferably a tertiary nitrogen base such as pyridine, trimethylamine or triethylamine and the chloride recovered as a hydrochloride of the tertiary nitrogen base. When M is a cationic salt-forming group, the by-product chloride is a salt of the cation and chloride. Preferred salt-forming cations are sodium and potassium but may also be ammonium or substituted ammonium.

In the preparation of the desired thiocarbonate product while employing the phenolic form of the chloropyridinol compound, i.e., M above is hydrogen, the appropriate chloropyridinol, the appropriate thiolchloroformate ester and a tertiary amine are mixed together in a solvent in the temperature range of from about 15° C. to about 120° C. whereupon a reaction takes place with the formation of the desired chloropyridinyl thiocarbonate ester product and amine hydrochloride salt by-product. Preferred solvents for carrying out the reaction are those in which the ester product is soluble and the by-product salt is substantially insoluble and include benzene and xylene. The amine hydrochloride salt by-product may be removed by filtration and the product recovered from the filtrate by distilling off the solvent. The product may then be purified by washing and/or recrystallizing from solvents such as pentane, hexane, heptane, etc., or such modifications thereof as is known to the skilled in the art.

In a preferred method for carrying out the reaction using the phenolic form of the chloropyridinol, the appropriate chloropyridinol, the appropriate thiolchloroformate ester and pyridine are stirred together in an appropriate solvent at ambient temperature and then heated to the reflux temperature of the reaction mixture and refluxed for from two to four hours to obtain the desired thiocarbonate ester product and pyridine hydrochloride by-product. The latter is removed by filtration, the filtrate subjected to distillation to remove the solvent and to recover the product as residue. The product may be purified as previously described.

In the preparation of the desired thiocarbonate product employing a preformed salt of chloropyridinol, i.e., wherein M in above formula is a salt forming cationic group, the salt of the appropriate chloropyridinol and appropriate thiolchloroformate ester are mixed together and intimately contacted in the temperature range of from about 15° C. to about 100° C. whereupon a reaction takes place with the formation of the desired chloropyridinyl thiocarbonate ester product and a chloride salt by-product. The reaction is preferably carried out in the presence of a solvent, with the by-product salt precipitating in the reaction mixture. Suitable solvents include dimethoxyethane, dioxane, diethyl ether and diisopropyl ether. The chloride salt by-product may be removed by filtration, and the product recovered from the filtrate by distilling off the solvent. The product may be purified by washing and/or recrystallizing, using solvents such as pentane, hexane, heptane, etc., or by employing such modifications as are known to the skilled in the art.

In a preferred method for carrying out the reaction, the sodium salt of the appropriate chloropyridinol and the appropriate thiolchloroformate ester are stirred together at ambient temperature in an appropriate solvent and the resulting mixture allowed to stand for from about 0.5 hour to overnight whereupon a reaction takes place to produce the desired thiocarbonate ester product and sodium chloride by-product. The latter is removed by filtration, the filtrate subjected to distillation to remove the solvent and the product recovered as residue. The product may be purified as previously described.

The following examples illustrate the invention but are not to be construed as limiting:

*Example 1.—S-methyl O-3,4,5,6-tetrachloro-2-pyridyl thiocarbonate*

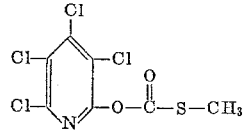

A solution of 4.4 grams (0.04 mole) of methyl thiol chloroformate in 30 milliliters of dimethoxyethane was added over a period of about 10 minutes to a solution of 10.0 grams (0.039 mole) of the sodium salt of 3,4,5,6-tetrachloro-2-pyridinol in 70 milliliters of dimethoxyethane. The reaction mixture was stirred for about 3 hours at a temperature in the range of from about 15° C. to 30° C. and thereafter allowed to stand at room temperature overnight. As a result of these operations, a reaction took place with the formation of the desired S-methyl O-3,4,5,6-tetrachloro-2-pyridyl thiocarbonate product and sodium chloride by-product. The sodium chloride was removed by filtration and the filtrate distilled to remove the solvent and recover the product as residue. The product was recrystallized from heptane to obtain a purified product as white crystals having a melting point of 80°–82° C. The yield of the product was 9 grams or 75 percent of theoretical. The product had elemental analyses in percent) as follows:

|  | Carbon | Hydrogen | Nitrogen | Sulfur |
|---|---|---|---|---|
| Theory | 27.4 | 0.98 | 4.56 | 10.42 |
| Found | 27.50 | 0.84 | 4.77 | 10.42 |

*Example 2.—S-methyl O-2,3,5-trichloro-4-pyridyl thiocarbonate*

4.2 grams (0.053 mole) of pyridine was added with stirring to a mixture of 5.85 grams (0.053 mole) of methyl thiolchloroformate and 10.0 grams (0.051 mole) of 2,3,5-trichloro-4-pyridinol in 100 milliliters of benzene. The addition was accompanied by some heat of reaction. The resulting mixture was heated at reflux temperature of the mixture for two hours whereupon a reaction took place with the formation of the desired S-methyl O-2,3,5-trichloro-4-pyridyl thiocarbonate product and pyridine hydrochloride by-product. The by-product salt was removed by filtration and the filtrate distilled to remove the solvent and to recover the S-methyl O-2,3,5-trichloro-4-pyridyl thiocarbonate product as residue. The product was recrystallized from hexane to obtain a purified product as light cream-colored crystals having a melting point of 70°–71.5° C. in a yield of 9.0 grams or 64.8 percent of theoretical. The product had elemental analyses as follows:

|  | Carbon | Hydrogen | Nitrogen |
|---|---|---|---|
| Theory | 30.9 | 1.48 | 5.12 |
| Found | 30.98 | 1.40 | 5.04 |

*Example 3.—S-n-propyl O-3,5,6-trichloro-2-pyridyl thiocarbonate*

A solution of 16.4 grams (0.12 mole) of n-propyl thiolchloroformate in 20 milliliters of benzene was added with stirring over a 10 minute period to a solution of 14 grams (0.071 mole) of 3,5,6-trichloro-2-pyridinol in a mixture of 80 milliliters of benzene and 10 milliliters of pyridine. After completion of the addition, the reaction mixture was heated at reflux temperature of the reaction mixture for five hours to obtain the desired S-n-propyl O-3,5,6-trichloro-2-pyridyl thiocarbonate product and pyridine hydrochloride by-product salt which precipitated in the reaction mixture. The salt was removed by filtration and the filtrate distilled under reduced pressure to vaporize off the benzene and to recover the product as residue. The product was recrystallized from hexane to obtain a purified product as white crystals melting at 45°–460° C. in a yield of 13 grams or 64 percent of theory. The product had elemental analyses as follows:

|  | Carbon | Hydrogen | Nitrogen | Chlorine | Sulfur |
|---|---|---|---|---|---|
| Theory | 36 | 2.68 | 4.66 | 35.50 | 10.65 |
| Found | 36.04 | 2.81 | 4.79 | 35.45 | 10.59 |

*Example 4.—S-phenyl O-2,3,5,6-tetrachloro-4-pyridyl thiocarbonate*

10.0 grams (0.043 mole) of 2,3,5,6-tetrachloro-4-pyridinol and 3.55 grams (0.045 mole) of pyridine in 100 milliliters of benzene was heated to 60° C. A solution of 7.8 grams (0.045 mole) of phenyl thiochloroformate in 20 milliliters of benzene was added slowly to the warm mixture whereupon an exothermic reaction took place resulting in refluxing of the reaction mixture. Thereafter, the mixture was heated at about 60° C. for about 2.5 hours to obtain an S-phenyl O-2,3,5,6-tetrachloro-4-pyridyl thiocarbonate product and pyridine hydrochloride salt by-product. The by-product salt was removed by filtration and the filtrate distilled to remove the solvent and to recover the desired product as a solid residue. The latter was recrystallized from a mixture of hexane and benzene to obtain a purified product having a melting point of 90°–90.5° C. as a white solid in a yield of 11.4 grams or 71.8 percent of theoretical. The product had elemental analyses as follows:

|  | Chlorine | Nitrogen | Sulfur |
|---|---|---|---|
| Theory | 38.4 | 3.79 | 8.69 |
| Found | 39.03 | 3.99 | 8.56 |

*Example 5.—S-methyl S-2,3,5,6-tetrachloro-4-pyridyl dithiocarbonate*

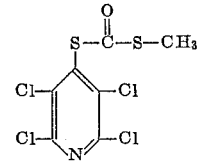

0.85 gram (0.035 gram atom) of sodium was added portionwise to 100 milliliters of ethanol to obtain a solution of sodium ethoxide in ethanol. 8.0 grams (0.032 mole) of 2,3,5,6-tetrachloro-4-pyridine-thiol was added to the resulting solution to obtain a sodium 2,3,5,6-tetrachloro-4-pyridinethiolate reactant in the reaction mixture. The mixture was heated to distill off the solvent and to recover the sodium 2,3,5,6-tetrachloro-4-pyridinethiolate as residue. The latter was dissolved in 60 milliliters of dimethoxyethane and 3.9 grams (0.035 mole) of methyl thiolchloroformate added thereto. The mixture was stirred for about one hour and then allowed to stand overnight whereupon a reaction took place with the formation of the desired S-methyl S-2,3,5,6-tetrachloro-4-pyridyl dithiocarbonate product and sodium chloride by-product which precipitated in the reaction mixture. The latter was removed by filtration and the filtrate subjected to reduced pressure to vaporize off the solvent and to recover the product as residue. The product was purified with activated charcoal and recrystallized from hexane to obtain a purified product having a melting point of 91.4°–92.4° C. The product had elemental analyses as follows:

|  | Carbon | Hydrogen | Nitrogen | Sulfur |
|---|---|---|---|---|
| Theory | 26.01 | 0.94 | 4.33 | 19.80 |
| Found | 26.25 | 0.82 | 4.55 | 19.75 |

*Example 6.—S-methyl O-5-chloro-3-pyridyl thiocarbonate*

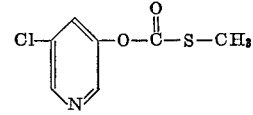

4.0 grams (0.031 mole) of 5-chloro-3-pyridinol, 3.66 grams (0.033 mole) of methyl thiolchloroformate, 2.76 grams (0.035 mole) of pyridine and 60 milliliters of dimethoxyethane were mixed together and heated at reflux temperature for about 3 hours whereupon a reaction took place with the formation of a S-methyl O-5-chloro-3-pyridyl thiocarbonate product and pyridine hydrochloride by-product. The mixture was distilled to remove the dimethoxyethane solvent and the residue was extracted first with hexane and then with dichloromethane to recover the thiocarbonate product in the extracting solvent. The solution was treated with activated carbon and the purified solution subjected to vaporization to remove the solvent and recover as residue the desired S-methyl O-5-chloro-3-pyridyl thiocarbonate as an orange oil having a molecular weight of 203.6. The product had elemental analyses as follows:

|  | Carbon | Hydrogen | Chlorine | Nitrogen | Sulfur |
|---|---|---|---|---|---|
| Theory | 41.4 | 2.98 | 17.40 | 6.9 | 15.7 |
| Found | 41.43 | 3.06 | 17.33 | 6.98 | 15.88 |

*Example 7.—S-ethyl O-3,4,5,6-tetrachloro-2-pyridyl thiocarbonate*

In an operation carried out in a manner similar to that described in Example 1, 5.09 grams (0.04 mole) of ethyl thiochloroformate in 30 milliliters of dimethoxyethane was mixed together and reacted with 10.0 grams (0.0394 mole) of the sodium salt of 3,4,5,6-tetrachloro-2-pyridinol in 70 milliliters of dimethoxyethane to obtain the desired S-ethyl O-3,4,5,6-tetrachloro-2-pyridyl thiocarbonate product as a white solid having a molecular weight of 321. Infrared spectral analysis of the product showed characteristic carbonyl absorption in the region 5.75–5.8μ, a strong, broad band in the region 9.2–9.8μ characteristic of the series of thio esters, and sharp peaks characteristic to the compound at 11.9μ and 13.25–13.35μ.

*Example 8.—S-methyl O-3,5,6-trichloro-2-pyridyl thiocarbonate*

In a manner similar to that described in Example 1, 4.4 grams (0.04 mole) of methyl thiolchloroformate in 30 milliliters of dimethoxyethane was intimately contacted with 8.0 grams (0.036 mole) of the sodium salt of 3,5,6-trichloro-2-pyridinol in 65 milliliters of dimethoxyethane to obtain the desired S-methyl O-3,5,6-trichloro-2-pyridyl thiocarbonate product as a white solid having a molecular weight of 272.5. Infrared spectral analysis of the product showed characteristic carbonyl absorption in the region 7.75–5.8μ, thio ester band in the region 9.2–9.8μ and additional peaks at 8.0μ and 14.8μ.

*Example 9.—S-methyl O-2,3,5,6-tetrachloro-4-pyridyl thiocarbonate*

In a manner similar to that described in Example 1, 4.4 grams (0.04 mole) of methyl thiolchloroformate in 30 milliliters of dimethoxyethane was mixed and reacted with 10.0 grams (0.039 mole) of the sodium salt of 2,3,5,6-tetrachloro-4-pyridinol in 70 milliliters of dimethoxyethane to obtain the desired S-methyl O-2,3,5,6-tetrachloro-4-pyridyl thiocarbonate product as a white solid having a melting point of 99°–101° C.

*Example 10*

In a manner similar to that described in Example 1, the following compounds are prepared:

S-ethyl O-2,3,5,6-tetrachloro-4-pyridyl thiocarbonate as a white solid having a molecular weight of 321 by the reaction of ethyl thiolchloroformate and the sodium salt of 2,3,5,6-tetrachloro-4-pyridinol. Infrared spectral analysis of the product showed carbonyl absorption in the region 5.78–5.8μ, thio ester band in the region 9.2–9.8μ and additional peaks at 6.5μ, 6.6μ, 7.5μ, 7.6μ and 14.1μ.

S-ethyl O-3,5,6-trichloro-2-pyridyl thiocarbonate as a white solide having a molecular weight of 286.5 by the reaction of ethyl thiolchloroformate and the sodium salt of 3,5,6-trichloro-2-pyridinol. Infrared spectral analysis of the product showed carbonyl absorption in the region 5.75–5.8μ, thio ester band in the region 9.2–9.8μ and additional peaks at 8.0μ and 14.8μ.

S-phenyl O-3,5,6-trichloro-2-pyridyl thiocarbonate as a white solid having a melting point of 109°–110° C. by the reaction of phenyl thiolchloroformate and the sodium salt of 3,5,6-trichloro-2-pyridinol.

S-phenyl O-3,4,5,6-tetrachloro-2-pyridyl thiocarbonate as a white solid having a melting point of 103°–104° C. by the reaction of phenyl thiolchloroformate and the sodium salt of 3,4,5,6-tetrachloro-2-pyridinol.

S-(o-tolyl) O-2,6-dichloro-4-pyridyl thiocarbonate having a molecular weight of 314 by the reaction of o-tolyl thiolchloroformate and the sodium salt of 2,6-dichloro-4-pyridinol.

S-(3,5-xylyl) O-2-chloro-4-pyridyl thiocarbonate having a molecular weight of 294 by the reaction of 3,5-xylyl thiolchloroformate and the sodium salt of 2-chloro-4-pyridinol.

S-carvacryl O-5-chloro-3-pyridyl thiocarbonate having a molecular weight of 321.5 by the reaction of carvacryl thiolchloroformate and the sodium salt of 5-chloro-3-pyridinol.

S-(n-decyl) O-2,3,4,5-tetrachloro-2-pyridyl thiacarbonate having a molecular weight of 533 by the reaction of n-decyl thiolchloroformate and the sodium salt of 2,3,4,5-tetrachloro-2-pyridinol.

S-(n-hexyl) O-2,3,5-trichloro-4-pyridyl thiocarbonate having a molecular weight of 342.5 by the reaction of n-hexyl thiolchloroformate and the sodium salt of 2,3,5-trichloro-4-pyridinol.

*Example 11*

In a manner similar to that described in Examples 2–4, the following compounds are prepared:

S-methyl O-2,6-dichloro-4-pyridyl thiocarbonate having a melting point of 37°–39° C. by the reaction of methyl thiolchloroformate, 2,6-dichloro-4-pyridinol and pyridine.

S-methyl O-4,6-dichloro-2-pyridyl thiocarbonate having a melting point of 57°–58° C. by the reaction of methyl thiolchloroformate, 4,6-dichloro-2-pyridinol and pyridine.

S-phenyl O-4,6-dichloro-2-pyridyl thiocarbonate having a melting point of 63° C. by the reaction of phenyl thiolchloroformate, 4,6-dichloro-2-pyridinol and pyridine.

S-phenyl O-6-chloro-2-pyridyl thiocarbonate having a melting point of 88°–89° C. by the reaction of phenyl thiolchloroformate, 6-chloro-2-pyridinol and pyridine.

S-(n-octyl) O-2,3,5,6-tetrachloro-4-pyridyl thiocarbonate as a yellow oil having a molecular weight of 405 by the reaction of n-octyl thiolchloroformate, 2,3,5,6-tetrachloro-4-pyridinol and pyridine.

S-(n-octyl) O-2,3,5-trichloro-4-pyridyl thiocarbonate as a light amber oil having a molecular weight of 370.5 by the reaction of n-octyl thiolchloroformate, 2,3,5-trichloro-4-pyridinol and pyridine.

S-(n-propyl) 2,3,5,6-tetrachloro-4-pyridyl thiocarbonate as an oil having a molecular weight of 335 by the reaction of n-propyl thiolchloroformate, 2,3,5,6-tetrachloro-4-pyridinol and pyridine.

S-(n-propyl) 2,3,5-trichloro-4-pyridyl thiocarbonate as an oil having a molecular weight of 300.5 by the reaction of n-propyl thiolchloroformate, 2,3,5-trichloro-4-pyridinol and pyridine.

S-ethyl 2,3,5-trichloro-4-pyridyl thiocarbonate as an oil having a molecular weight of 286.5 by the reaction of ethyl thiolchloroformate, 2,3,5-trichloro-4-pyridinol and pyridine.

S-phenyl O-2,3,5-trichloro-4-pyridyl thiocarbonate as an oil having a molecular weight of 234.5 by the reaction of phenyl thiolchloroformate, 2,3,5,4-pyridinol and pyridine.

S-mesityl O-5-chloro-3-pyridyl thiocarbonate having a molecular weight of 307.5 by the reaction of mesityl thiolchloroformate, 5-chloro-3-pyridinol and pyridine.

S-phenyl O-5-chloro-3-pyridyl thiocarbonate having a molecular weight of 265.5 by the reaction of phenyl thiolchloroformate, 5-chloro-3-pyridinol and pyridine.

S-(n-decyl) O-5-chloro-3-pyridyl thiocarbonate having a molecular weight of 327.5 by the reaction of n-decyl thiolchloroformate, 5-chloro-3-pyridinol and pyridine.

S-isoamyl O-5-chloro-pyridyl thiocarbonate having a molecular weight of 259.5 by the reaction of isoamyl thiolchloromate, 5-chloro-3-pyridinol and pyridine.

S-(2,4-xylyl) O-2,4,6-trichloro-3-pyridyl thiocarbonate having a molecular weight of 378.5 by the reaction of 2,4-xylyl thiolchloroformate, 2,4,6-trichloro-3-pyridinol and pyridine.

S-(p-ethylphenyl) O-2,4-dichloro-3-pyridyl thiocarbonate having a molecular weight of 344 by the reaction of p-ethylphenyl thiolchloroformate, 2,4-dichloro-3-pyridinol and pyridine.

S-(p-tolyl) O-2,6-dichloro-3-pyridyl thiocarbonate having a molecular weight of 314 by the reaction of p-tolyl thiolchloroformate, 2,6-dichloro-pyridinol and pyridine.

S-(m-tolyl) O-2,5-dichloro-3-pyridyl thiocarbonate having a molecular weight of 314 by the reaction of m-tolyl thiolchloroformate, 2,5-dichloro-3-pyridinol and pyridine.

S-(n-heptyl) O-2-chloro-3-pyridyl thiocarbonate having a molecular weight of 287.5 by the reaction of n-heptyl thiolchloroformate, 2-chloro-3-pyridinol and pyridine.

*Example 12*

In a manner similar to that described in Example 5, the following compounds are prepared:

S-(n-butyl) O-2,3,5-trichloro-4-pyridyl dithiocarbonate having a molecular weight of 330.5 by the reaction of n-butyl thiolchloroformate and sodium 2,3,5-trichloro-4-pyridinethiolate.

S-(p-tolyl) O-2,6-dichloro-4-pyridyl dithiocarbonate having a molecular weight of 330 by the reaction of p-tolyl thiolchloroformate and sodium 2,4-dichloro-4-pyridinethiolate.

S-(2,4-xylyl) O-2,3,5,6-tetrachloro-4-pyridyl dithiocarbonate having a molecular weight of 413 by the reaction of 2,4-xylyl thiolchloroformate and sodium 2,3,5,6-tetrachloro-4-pyridinethiolate.

S-(n-heptyl) O-3,5,6-trichloro-2-pyridyl dithiocarbonate having a molecular weight of 372.5 by the reaction of n-heptyl thiolchloroformate and sodium 3,5,6-trichloro-2-pyridinethiolate.

S-(sec.-amyl) O-3,5,6-trichloro-2-pyridyl dithiocarbonate having a molecular weight of 344.5 by the reaction of sec.-amyl thiolchloroformate and sodium 3,5,6-trichloro-2-pyridinethiolate.

S-thymyl O-5-chloro-3-pyridyl dithiocarbonate having a molecular weight of 337.5 by the reaction of thymyl thiolchloroformate and sodium 5-chloro-3-pyridinethiolate.

S-isopropyl O-2,4,6-trichloro-3-pyridyl dithiocarbonate having a molecular weight of 316.5 by the reaction of isopropyl thiolchloroformate and sodium 2,4,6-trichloro-3-pyridinethiolate.

S-(p-isopropylphenyl) O-2,4-dichloro-3-pyridyl dithiocarbonate having a molecular weight of 358 by the reaction of p-isopropyl thiolchloroformate and sodium 2,4-dichloro-pyridinethiolate.

S-(n-propyl) O-2-chloro-3-pyridyl dithiocarbonate having a molecular weight of 386 by the reaction of n-propyl thiolchloroformate and sodium 2-chloro-3-pyridinethiolate.

S-(p-ethylphenyl) O-2,3,5,6-tetrachloro-4-pyridyl dithiocarbonate having a molecular weight of 413 by the reaction of p-ethylphenyl thiolchloroformate and sodium 2,3,5,6-tetrachloro-4-pyridinethiolate.

S-(n-hexyl) O-2,4,6-trichloro-3-pyridyl dithiocarbonate having a molecular weight of 358.5 by the reaction of n-hexyl thiolchloroformate and sodium 2,4,6-trichloro-3-pyridinethiolate.

S-(2,4-diethylphenyl) O-2-chloro-3-pyridyl dithiocarbonate having a molecular weight of 337.5 by the reaction of 2,4-diethylphenyl thiolchloroformate and sodium 2-chloro-3-pyridinethiolate.

S-(2,4,6-trimethylphenyl) O-2,6-dichloro-3-pyridyl dithiocarbonate having a molecular weight 358 by the reaction of 2,4,6-trimethylphenyl thiochloroformate and sodium 2,6-dichloro-3-pyridinethiolate.

The products of the present invention have numerous useful properties. For example, the compounds are useful for the control of fungi including those which are present in soil or on plants and are detrimental to plant life. Representative of such use is the control of such organisms as *Alternaria solani*, *Monilia fructicola*, bean rust organism, etc. In representative operations for such use, S-methyl O-3,4,5,6-tretrachloro-2-pyridyl thiocarbonate, S-methyl O-2,3,5,6-tetrachloro-4-pyridyl thiocarbonate, S-methyl S-2,3,5,6-tetrachloro-4-pyridyl dithiocarbonate, S-methyl O-2,3,5-trichloro-4-pyridyl thiocarbonate and S-phenyl O-5-chloro-2-pyridyl thiocarbonate were separately contacted with a suspension of *Monilia fructicola* in a 0.01 molar, pH 7 phosphate buffer to provide therein a concentration of one of the thiocarbonate esters of 10 parts by weight per million parts by weight of water. The resulting suspensions were shaken at ambient temperature for 24 hours and thereafter plated on nutrient agar and incubated for 3 days. At the end of this period, excellent inhibitory controls of the growth of the organisms were observed.

The products are also useful for the control of various helminths. In a representative operation demonstrating the control of helminths infesting warm blooded animals, S-methyl 2,3,5,6-tetrachloro-4-pyridyl thiocarbonate and S-ethyl 3,4,5,6-tetrachloro-2-pyridyl thiocarbonate were separately incorporated into feed in an amount of 0.06 percent by weight of feed and the feed fed to mice infected with tapeworm for seven days after which the mice were sacrificed and examined. Examination showed both thiocarbonates to give complete control of tapeworms.

The thiocarbonate esters are also useful as active components of pesticidal compositions and are adapted to be employed for the control of pests such as mites, insects and trash fish. The esters are also useful as constituents of herbicides for the control of undersirable plants and plant parts.

The chloropyridinols useful in carrying out the present invention may be prepared by heating an appropriate chloropyridine having one more chlorine atom than the desired chloropyridinol with about 10 percent aqueous caustic at temperatures of from about 160° to about 225° C. for about 2 to 3 hours. This is the preferred method for preparing chloro-substituted 2- and 4-pyridinols. Alternatively, the desired chloropyridinols may be prepared by passing chlorine through an aqueous solution of pyridinol at ambient temperatures. Certain of the mono- and dichloropyridinols may be prepared by special procedures. For example, 2-chloro-3-pyridinol may be prepared by intimately contacting 3-pyridinol with hydrochloric acid and hydrogen peroxide at room temperature, 2,5-dichloro-3-pyridinol may be made in a similar manner. Certain chloropyridinols may also be prepared by chloronating an aminopyridine by conventional procedures and thereafter treating the amino chloropyridine obtained with nitrous acid. Thus, for example, 2,6-dichloro-3-pyridinol may be prepared in such a manner.

The chloropyridinethiols useful in preparing the compounds of the present invention may be prepared by heatting the appropriate halopyridine with potassium hydrogen sulfide or potassium sulfide or hydrogen sulfide in alcohol or glycol solution for from one-half to about 20 hours. The chloropyridinethiol reactants may also be prepared by reducing the chloropyridinesulfonyl chloride with stannous chloride or zinc and aqueous acid according to procedures conventional for the preparation of thiophenol type compounds. Certain of the chloropyridinethiols may be prepared by special alternative methods. Thus, for example, chloropyridinethiols may be prepared by diazotizing the corresponding aminochloropyridine followed by the reaction of the diazonium salt with potassium ethyl xanthate to produce successively a diazonium xanthate and then S-chloropyridyl ethyl xanthate which is then hydrolyzed under alkaline conditions to produce a chloropyridinethiol.

The sodium salts of chloropyridinol and chloropyridinethiol may be prepared by reacting sodium with chloropyridinol or chloropyridinethiol according to conventional procedures.

The reactant thiolchloroformate esters are readily commercially available. They may be prepared by passing phosgene through the appropriate mercaptan or a solution thereof in an inert solvent in the cold.

The preferred compounds of the present invention may be represented by the formula

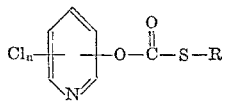

We claim:
1. A thiocarbonic acid ester having the formula

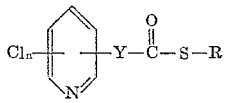

wherein Y is selected from the group consisting of oxygen and sulfur, R is selected from the group consisting of alkyl from 1 to 10 carbon atoms, inclusive, and aryl wherein said aryl is selected from the group consisting of phenyl and alkylphenyl containing from 6 to 10 carbon atoms, inclusive; and $n$ is an integer of from 1 to 4, inclusive.

2. S-methyl O-3,4,5,6-tetrachloro-2-pyridyl thiocarbonate.
3. S-methyl O-2,3,5-trichloro-4-pyridyl thiocarbonate.
4. S-methyl O-2,3,5,6-tetrachloro-4-pyridyl thiocarbonate.
5. S-methyl S-2,3,5,6-tetrachloro-4-pyridyl dithiocarbonate.
6. S-ethyl O-3,4,5,6-tetrachloro-2-pyridyl thiocarbonate.
7. S-methyl O-3,5,6-trichloro-2-pyridyl thiocarbonate.
8. S-phenyl O-2,3,5,6-tetrachloro-4-pyridyl thiocarbonate.
9. S-methyl S-2,3,5,6-tetrachloro-4-pyridyl dithiocarbonate.
10. S-methyl O-5-chloro-3-pyridyl thiocarbonate.

References Cited by the Examiner
UNITED STATES PATENTS
3,151,024   9/1964   D'Amico _____ 260—294.8

WALTER A. MODANCE, *Primary Examiner.*